(12) United States Patent
Mouskis

(10) Patent No.: US 9,352,847 B2
(45) Date of Patent: May 31, 2016

(54) PRESSURE REGULATOR VALVE

(71) Applicant: FLIGHT REFUELLING LIMITED, Dorset (GB)

(72) Inventor: Christopher Mouskis, Dorset (GB)

(73) Assignee: Flight Refuelling Limited, Dorset (GB)

( * ) Notice: Subject to any disclaimer, the term of this patent is extended or adjusted under 35 U.S.C. 154(b) by 272 days.

(21) Appl. No.: 13/939,741

(22) Filed: Jul. 11, 2013

(65) Prior Publication Data
US 2013/0333803 A1    Dec. 19, 2013

Related U.S. Application Data

(62) Division of application No. 12/601,719, filed as application No. PCT/GB2008/001759 on May 22, 2009, now abandoned.

(30) Foreign Application Priority Data

May 25, 2007  (GB) .................................. 0710090.2

(51) Int. Cl.
| G05D 16/10 | (2006.01) |
| B64D 39/06 | (2006.01) |
| B67D 7/04  | (2010.01) |
| B67D 7/36  | (2010.01) |
| G05D 16/16 | (2006.01) |

(52) U.S. Cl.
CPC *B64D 39/06* (2013.01); *B67D 7/04* (2013.01); *B67D 7/36* (2013.01); *G05D 16/106* (2013.01); *G05D 16/166* (2013.01); *Y10T 137/0318* (2015.04); *Y10T 137/7762* (2015.04); *Y10T 137/7837* (2015.04); *Y10T 137/7838* (2015.04); *Y10T 137/87981* (2015.04)

(58) Field of Classification Search
CPC ............ B64D 39/06; B67D 7/04; B67D 7/36; G05D 16/106; G05D 16/166; Y10T 137/0318; Y10T 137/7795; Y10T 137/7908; Y10T 137/7822; Y10T 137/7825; Y10T 137/7828
USPC ............ 137/505.12, 505.26, 505.38, 505.41, 137/505.44
See application file for complete search history.

(56) References Cited

U.S. PATENT DOCUMENTS

| 2,471,160 | A | 5/1949 | Matson et al. |
| 2,561,214 | A | 7/1951 | Matson et al. |
| 2,829,670 | A | 4/1958 | Nix |

(Continued)

FOREIGN PATENT DOCUMENTS

| GB | 715503 | 9/1954 |
| GB | 739897 | 11/1955 |
| GB | 955699 | 8/1956 |

OTHER PUBLICATIONS

Search Report issued in United Kingdom Application No. GB 0710090.2 on Sep. 13, 2007 (1 page).

(Continued)

*Primary Examiner* — William McCalister
(74) *Attorney, Agent, or Firm* — Finnegan, Henderson, Farabow, Garrett & Dunner, LLP

(57) ABSTRACT

A pressure regulator valve arrangement may include first and second regulator valves for closing a fluid passage in the event of over-pressure. The valve members may each have pressure ports for sensing the pressure, and the ports may be located downstream of the valve members to minimize interaction between the valves.

16 Claims, 10 Drawing Sheets

(56) References Cited

U.S. PATENT DOCUMENTS

| | | | |
|---|---|---|---|
| 2,891,569 A | 6/1959 | Goodner | |
| 2,940,468 A * | 6/1960 | Drabik et al. | 137/461 |
| 2,993,507 A | 7/1961 | Daly | |
| 3,125,115 A * | 3/1964 | Gard | 137/220 |
| 3,359,998 A | 12/1967 | Fike | |
| 3,489,165 A | 1/1970 | Salerno | |
| 3,500,864 A * | 3/1970 | Seiler, Jr. et al. | 137/614.19 |
| 3,586,033 A | 6/1971 | Hieber | |
| 3,586,291 A | 6/1971 | Malec | |
| 3,605,788 A * | 9/1971 | Brown | 137/220 |
| 3,976,100 A | 8/1976 | Souslin | |
| 4,041,980 A * | 8/1977 | Grotloh | 137/599.16 |
| 4,450,858 A | 5/1984 | Acomb | |
| 4,481,969 A | 11/1984 | Fallon et al. | |
| 4,561,465 A * | 12/1985 | Rogers | 137/614.05 |
| 4,699,351 A | 10/1987 | Wells | |
| 5,158,107 A | 10/1992 | Teay | |
| 6,186,168 B1 * | 2/2001 | Schultz et al. | 137/505.11 |
| 6,253,708 B1 | 7/2001 | Johnson | |
| 7,077,158 B2 * | 7/2006 | Gerasimov | 137/505.18 |
| 7,588,047 B2 * | 9/2009 | Vogt | 137/220 |
| 2011/0000555 A1 * | 1/2011 | Smidt et al. | 137/511 |

OTHER PUBLICATIONS

International Search Report and Written Opinion issued in PCT International Application No. PCT/GB2008/001759 mailed Nov. 9, 2009 (13 pages).

International Preliminary Report on Patentability for PCT/GB2008/001759 dated Dec. 1, 2009 (6 pages).

* cited by examiner

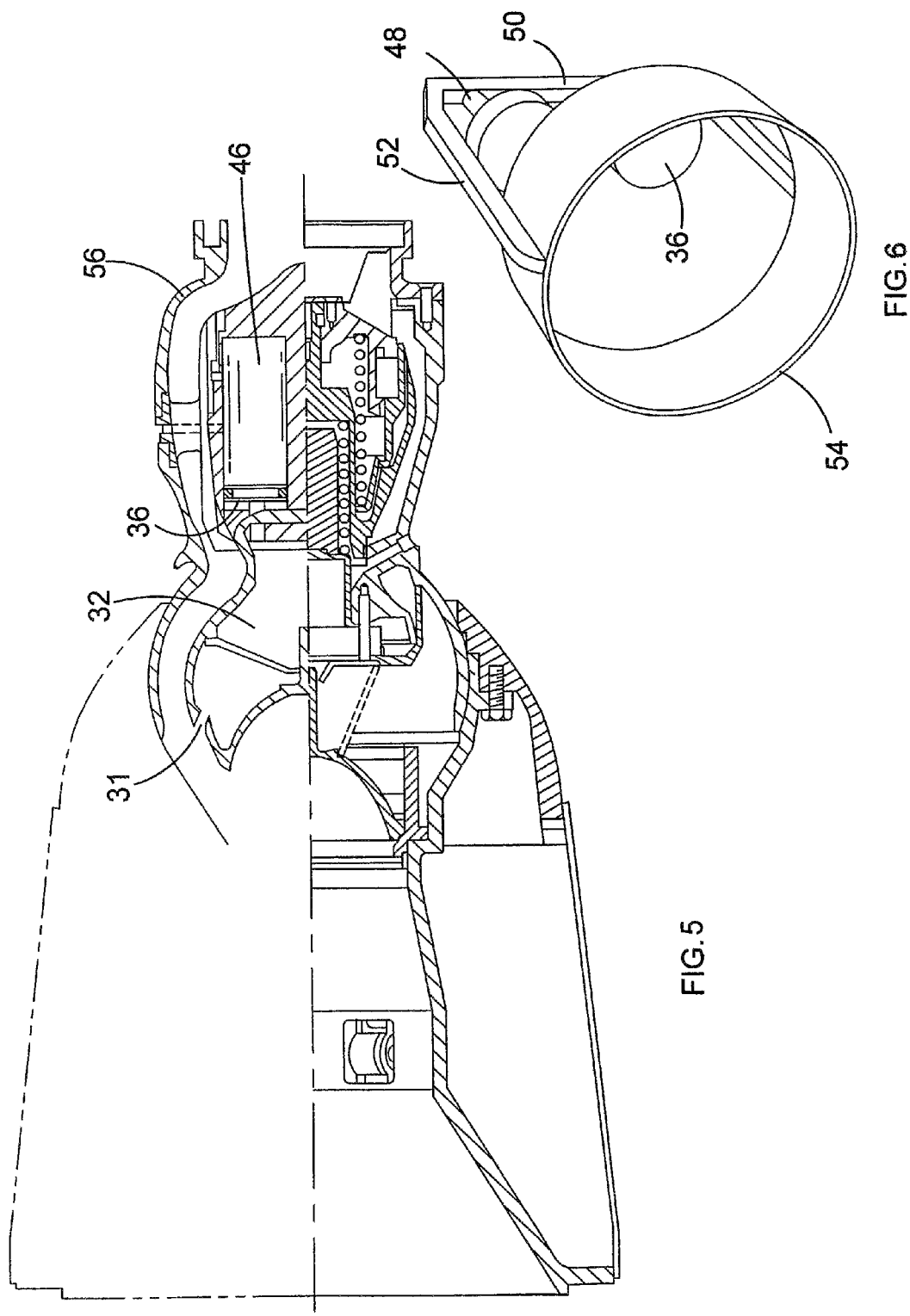

PRESSURE REGULATOR VALVE

This is a division of U.S. patent application Ser. No. 12/601,719, which has a §371(c) date of Jun. 8, 2010, and which is an entry into the national stage under 35 U.S.C. §371 of International PCT Application No. PCT/GB2008/001759, filed May 22, 2008, and claims the priority of United Kingdom Application No. 0710090.2 filed May 25, 2007, all of which are incorporated herein by reference.

This invention relates to fuel regulators such as those used in the reception coupling of a refuelling drogue for use in air-to-air refuelling.

Such a reception coupling is attached to a fuel supply hose at one end, and has a valve at the other end which is pushed open upon insertion of a refuelling probe. This allows fuel to flow from the refuelling hose through a passage in the coupling into the probe to refuel the aircraft. Fuel is pumped to the hose under pressure so as to achieve a high flow rate. Should the delivery path become blocked downstream of the probe valve, for example because the following aircraft has completed refuelling, the fuel pressure in the reception coupling may become very high. For safety reasons, it is necessary to provide a pressure regulator valve to shut off the fuel supply at such high pressures. Regulations require that two such regulator valves should be provided in case of failure of one of the regulators.

Commonly the two regulator valves have been provided at spaced apart positions in the passage through the reception coupling. For example, one regulator valve is commonly provided at the inlet or upstream end of the reception coupling adjacent the hose, and the other regulator valve is provided downstream at the outlet adjacent the probe valve. This arrangement can lead to interaction between the two pressure regulators wherein the downstream regulator may start to close, blocking the flow of fuel in response to an increase in downstream pressure. Closing the downstream regulator will lead to an increase in upstream pressure, causing the upstream regulator to close. This will have the effect of reducing the downstream pressure, causing the downstream regulator to open. This behaviour can be cyclic, causing fluctuations in regulated pressure and system wear.

A means of eliminating this behaviour is to include a venturi in the fuel passage at a position where the upstream regulator senses the fuel pressure. This causes the total pressure sensed by the upstream regulator to increase as flow rate increases, thereby separating the regulated pressure of the regulators as flow increases, preventing the problem.

However, a disadvantage of this arrangement is that if the downstream pressure regulator fails, then the upstream regulator will regulate to an incorrect pressure at high flow rates. In addition, the inefficiency of the venturi contributes to a significant overall pressure drop for the reception coupling. This is undesirable as it increases the pressure requirement from the fuel pump. For example, it is common for-prior art regulators to produce a pressure drop of around 40 psi at a flow rate of 500 imperial gallons per minute. Since a pressure of around 50 psi is required at the probe valve, it is necessary to produce 90 psi at the inlet of the reception coupling.

Accordingly, there is a need to provide a regulator arrangement which alleviates these disadvantages.

According to the present invention there is provided a pressure regulator valve arrangement comprising a passage for fluid having an inlet and an outlet, and a valve for opening the outlet to deliver the fluid, the passage including first and second pressure regulator valves, the regulator valves each comprising a pressure port for sensing pressure in the passage, and a valve member arranged to close the passage in response to pressure at the pressure port exceeding a predetermined pressure, in which the pressure ports are both arranged downstream of both of the valve members.

Providing the pressure ports downstream of both of the valve members reduces the tendency for the valves to interact with each other, since the pressure between them is not sensed or used to operate the upstream regulator. Hence it is unnecessary to provide a venturi in the passage, such that the passage may be made larger in cross section. Thus the arrangement may be used in a reception coupling with a consequent low pressure loss across the reception coupling.

The delivery passage is commonly annular in shape, and the valves may be sleeve valves, with valve members being correspondingly annular in shape. The valve members may be closely adjacent or concentrically arranged. This further serves to prevent interaction between the regulators.

The invention will now be described with reference to the accompanying drawings in which:

FIG. 5 is a view similar to FIG. 3 taken along a perpendicular cross-section;

FIG. 6 is a perspective view of a second valve member of the regulator valve arrangement of FIGS. 3 and 5;

Figure 1:
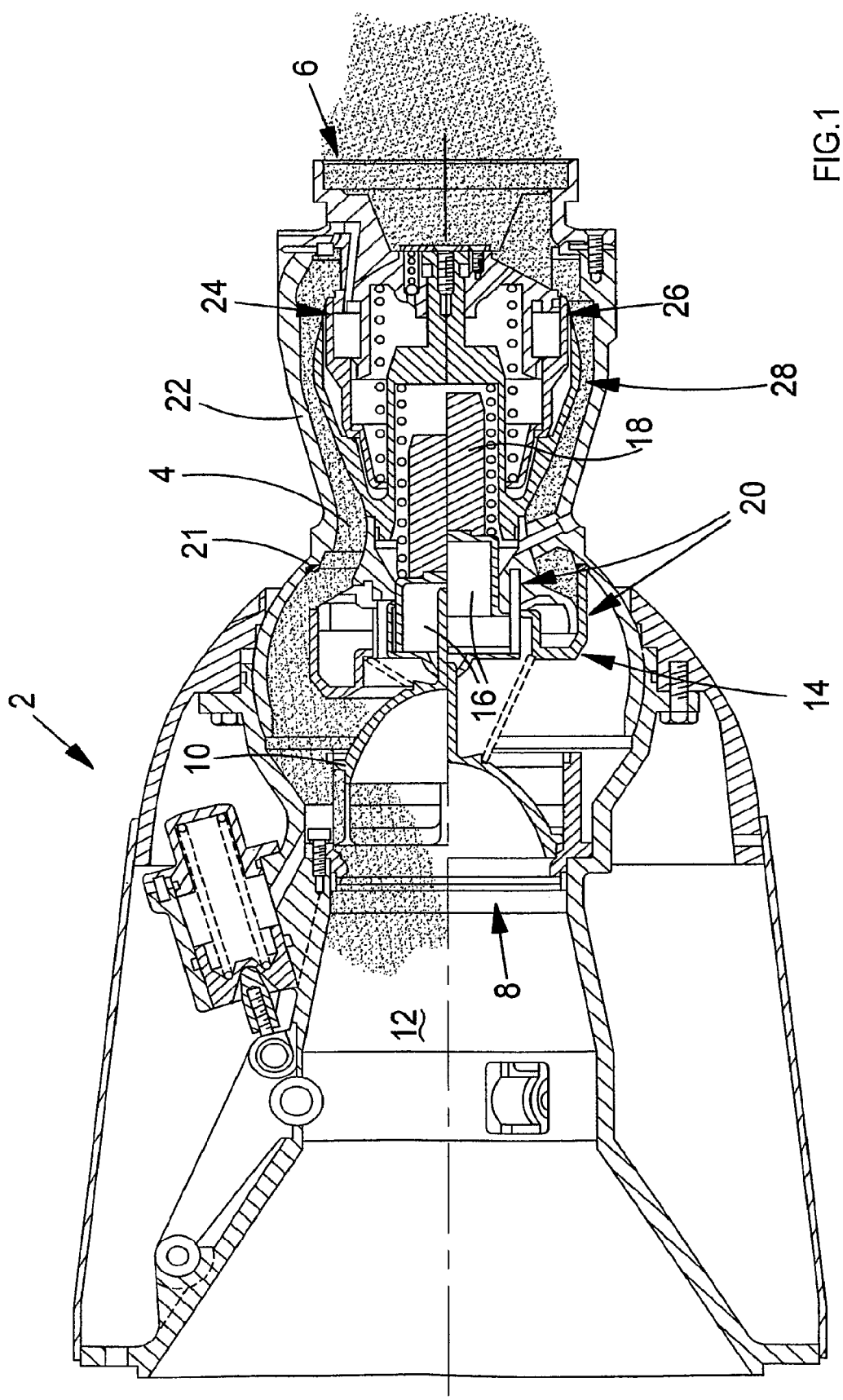
FIG. 1 is a cross-sectional side view of a reception coupling according to the prior art.

Referring to FIG. 1, the reception coupling 2 includes a fuel passage 4 having an inlet 6 for connecting to a fuel hose and an outlet 8 for communicating with the probe of a following aircraft to be refuelled. A probe valve member 10 is arranged at the outlet to be operable by the refuelling probe upon insertion into an opening 12 of the reception coupling 2. The valve member 10 is normally closed, and is pushed axially towards the inlet end 6 of the reception coupling into an open position by insertion of a probe. In this position, fuel may flow from the inlet end 6 through the passage 4 past the valve member 10 into the probe chamber 12. The probe has apertures for allowing the fuel to flow into the probe which communicates with the aircraft fuel tanks to be filled.

In order to prevent damage to the probe and following aircraft when refuelling is complete, it is necessary for the fuel flow to be stopped should the pressure in the passage 4 exceed a predetermined maximum. Therefore a regulator valve is required automatically to close the passage 4 upon such pressure being reached. In addition, safety regulations state that there should be two such valves in case one of the valves should fail. According to the prior arrangement, a first regulator valve 14 is provided adjacent the probe valve 10.

The passage 4 communicates with a first valve chamber 16 of the valve 14. Fuel pressure in the chamber 16 acts to push a first regulator piston 18 axially towards the inlet end of the coupling. A first valve sleeve member 20 attached to the piston thus moves axially towards the inlet. The passage 4 is curved such that the sleeve 20 crosses the passage 4 upon axial movement and abuts the seal 21 on the outside wall 22 of the coupling to close the passage 4. Thus the supply of fuel to the probe chamber 12 is stopped.

A second regulator valve 24 positioned adjacent the inlet end of the coupling works in a similar manner. Pressure in the passage 4 acts to push to the second regulator valve member 26 axially towards the inlet 6 to cross a curve in the passage 4 and block the flow of fluid.

In order to control the flow of fuel through this arrangement and to prevent interaction as described above, it has been found to be necessary to include a venturi 28 in the passage between the positions of the two regulator valves. However, this causes an undesirably large pressure drop between the inlet and the outlet of the passage 4. Also this arrangement tends not to be entirely successful in preventing the two valves from interacting with each other, whereby the first regulator valve tends to close prematurely at high flow rates.

Figure 2:
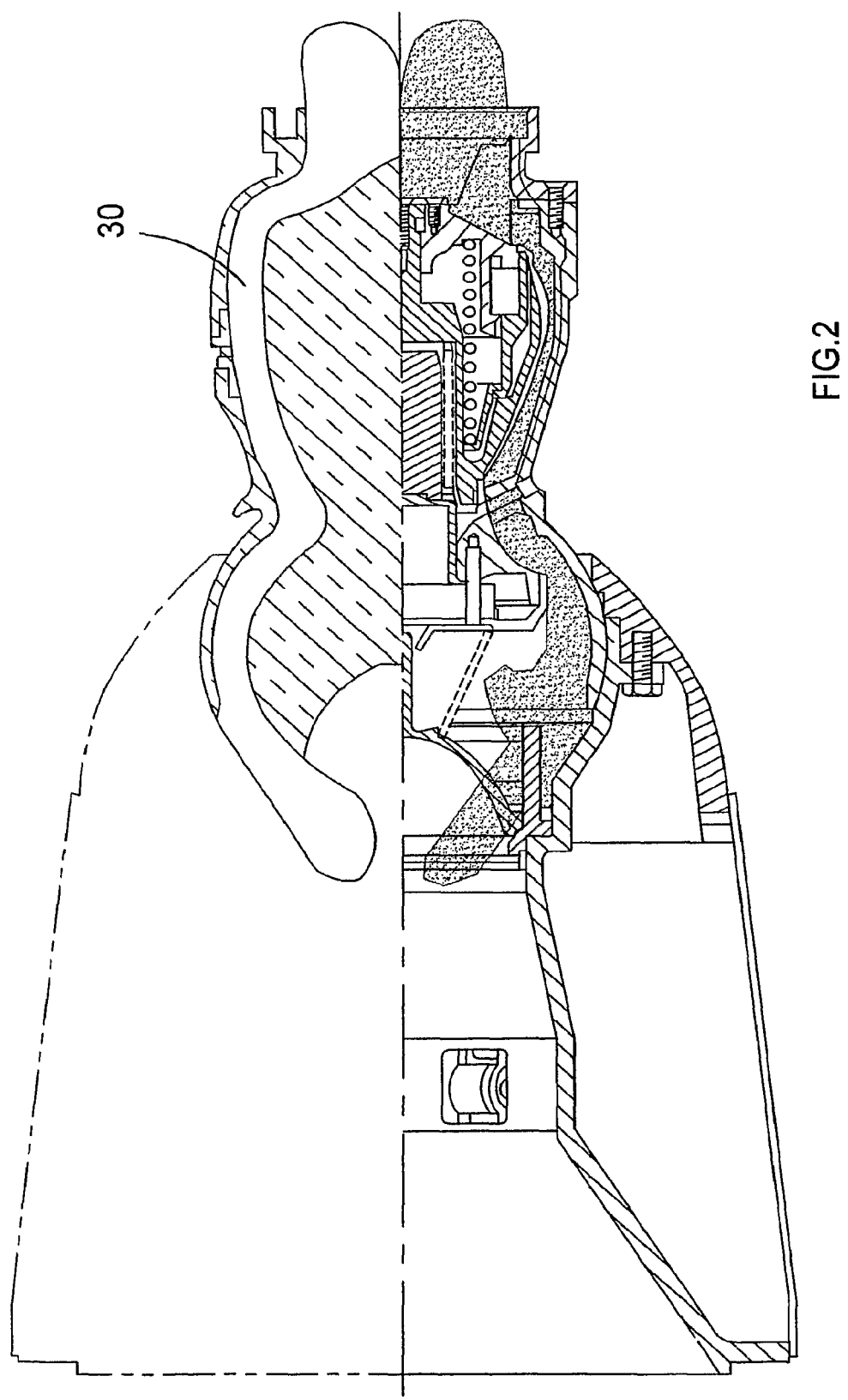
FIG. 2 is a cross-sectional side view of the reception coupling of FIG. 1, with a schematic view of the passage of a pressure regulator valve arrangement according to one embodiment of the invention superimposed on the upper part.
Figures 3, 4:
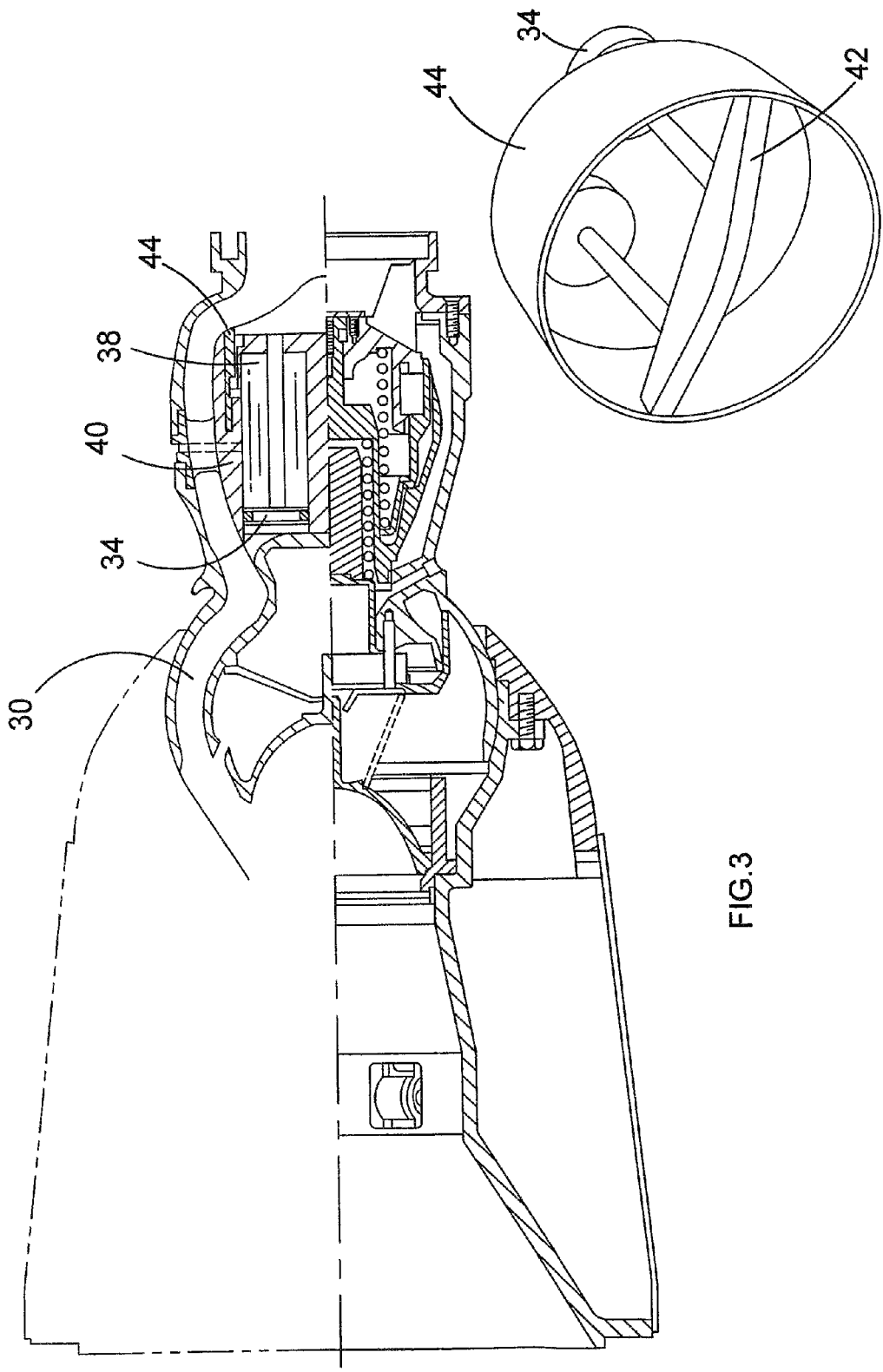
FIG. 3 is a cross-sectional side view similar to FIG. 2 showing the regulator valve arrangement of FIG. 2.
FIG. 4 is a perspective view of a first valve member of the regulator valve arrangement of FIG. 3.

Referring now to FIG. 2, according to the present invention a comparatively wide annular fuel passage 30 through the reception coupling alleviates the problem of a high pressure loss by the absence of obstructions such as the venturi which was necessary with the prior art arrangement.

Referring also to FIGS. 3-6, the passage 30 is in fluid communication via a pressure port 31 with a valve chamber 32. The valve chamber 32 includes actuators in the form of first and second pairs of valve pistons 34, 36. The first pair of valve pistons 34 are housed within a first pair of piston bores 38 in a centrally located regulator valve body 40. The pistons 34 are connected by a first cross member 42 to a first valve sealing member 44. The first valve member 44 is in the form of a thin plate in the shape of an axially extending ring or sleeve. The first valve member 44 extends around the circumference of the valve body 40 adjacent the inlet end of the passage 30, upstream of the pressure port 31.

Figure 7:
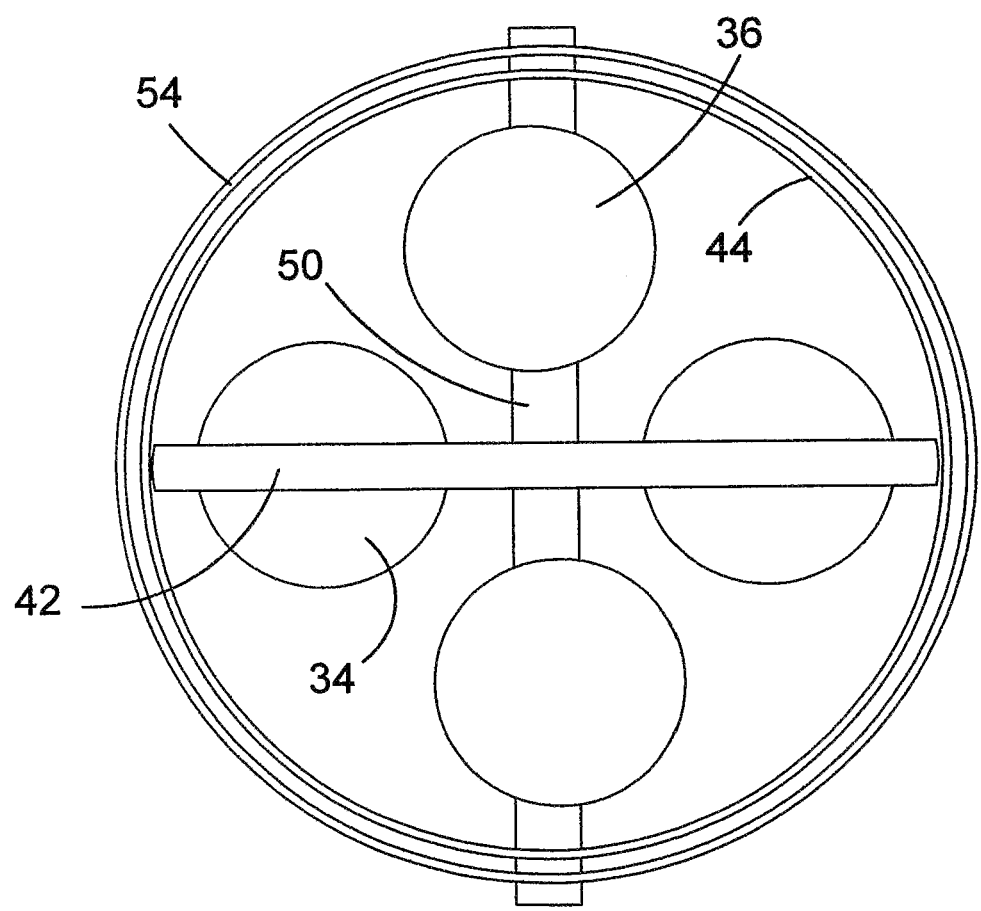
FIG. 7 is a cross-sectional end view of the regulator valve arrangement of FIGS. 3 and 5.

The second pair of valve pistons 36 are housed within a second pair of piston bores 46 in the valve body 40. The second pair of piston bores 46 are aligned along a diameter of the valve body 40 which is perpendicular to the diameter along which the first pair of piston bores 38 is arranged, as can be seen from FIG. 7. The second pair of pistons 36 are connected by a short piston rod 48 to a second cross member 50. The second cross member 50 has axially extending arms 52 at each end thereof attached to a second regulator valve member 54. The second valve member 54 has a similar shape to the first valve member 44 and is arranged concentrically around the first valve member 44 adjacent the passage 30 and upstream of the pressure port 31.

The pistons 34, 36 are spring biased towards the outlet end of the regulator by springs (not shown) arranged in the piston bores. In use, when the fluid pressure in the valve chamber 32 exceeds a pre-determined maximum pressure, it acts on the two pairs of pistons 34, 36 to push them in the axial direction towards the inlet end of the passage 30. Movement of the pistons towards the inlet causes the first and second valve members 44, 54 to extend across the passage 30 to the outside wall 56 of the regulator. This seals the passage 30 from fuel being provided from the refuelling hose.

Since the two regulator valve members are operated by fluid pressure in the same chamber downstream of the both valve members, and act substantially together in adjacent positions, they do not interact negatively with each other.

Furthermore, since it is no longer necessary to provide a venturi in the fuel passage, the pressure drop from the inlet to the outlet end of the passage 30 may be significantly reduced.

Figure 8:
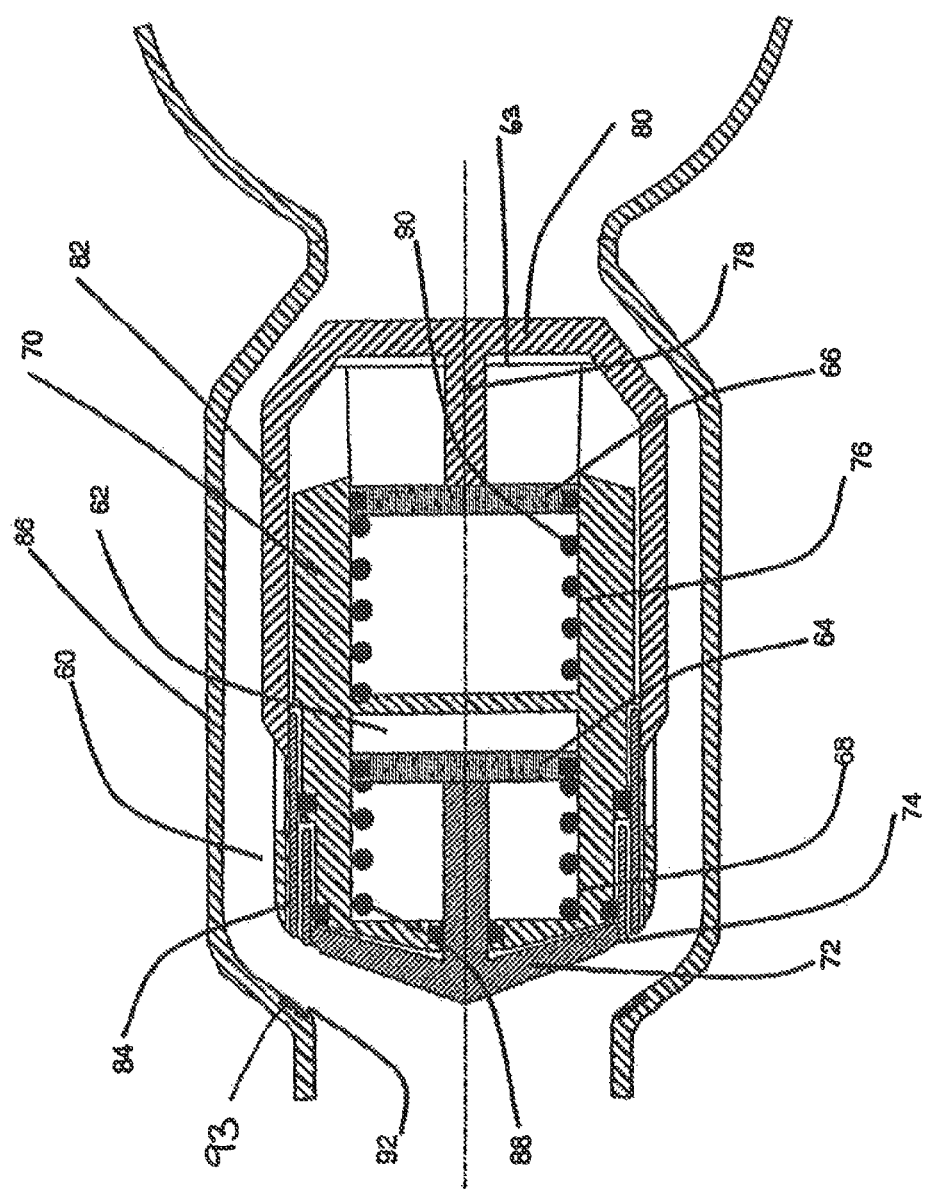
FIG. 8 is a cross-sectional view of a pressure regulator valve arrangement according to another embodiment of the invention.
Figure 9:
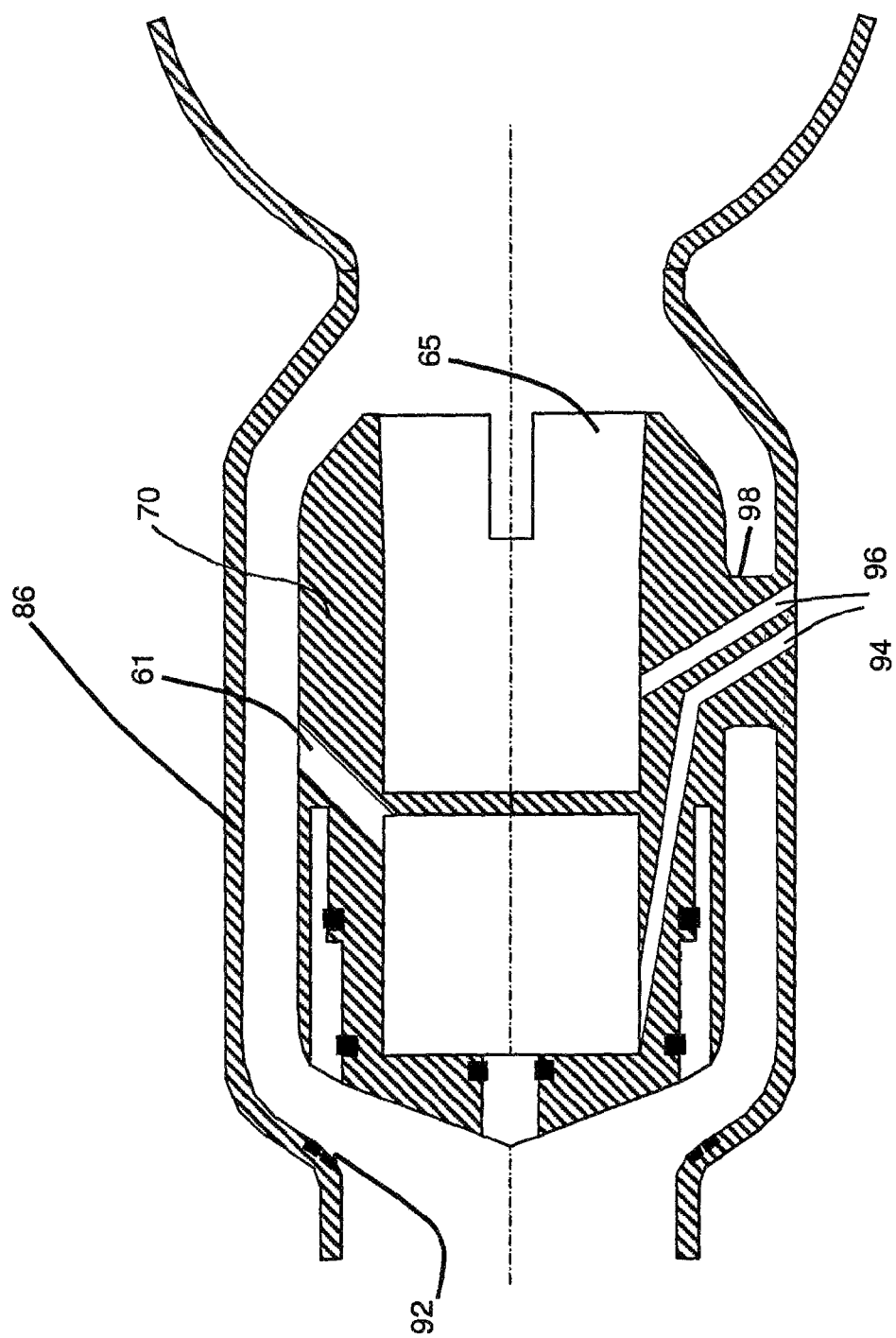
FIG. 9 is a view similar to FIG. 8 taken along a perpendicular cross section, and with the moving parts removed.

Referring to FIGS. 8 and 9, an alternative configuration is shown, in which the fuel passage 60 is in fluid communication with first and second valve chambers 62, 63 via a fuel pressure sensing ports 61, and an open end 65 of the valve body 70 respectively. The first valve chamber 62 includes a first valve piston 64. The first valve piston 64 is housed within the first piston bore 68 of the regulator valve body 70. The piston 64 is connected by a first cross member 72 to a first valve sealing member or regulator sleeve 74. The first regulator sleeve 74 is in the form of a thin plate, and extends around the circumference of the valve body 70 adjacent the inlet end of the passage 60.

Figure 10:
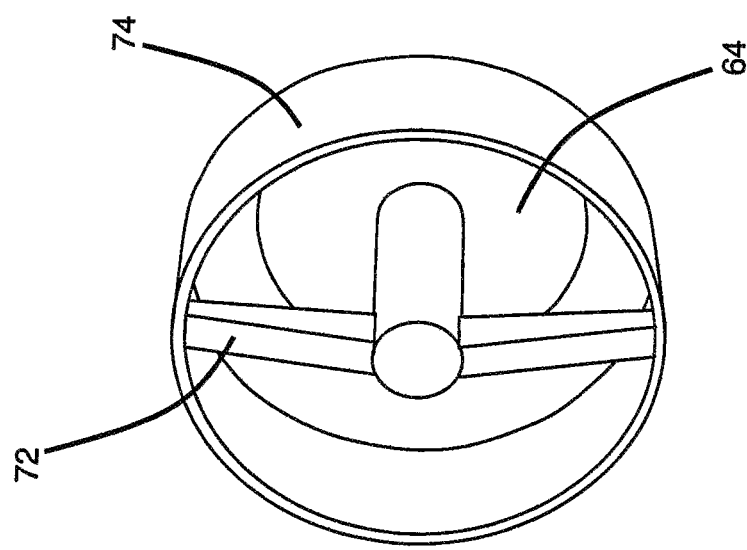
FIG. 10 is a perspective view of the inner regulator sleeve assembly of the embodiment of FIGS. 8 and 9.
Figure 11:
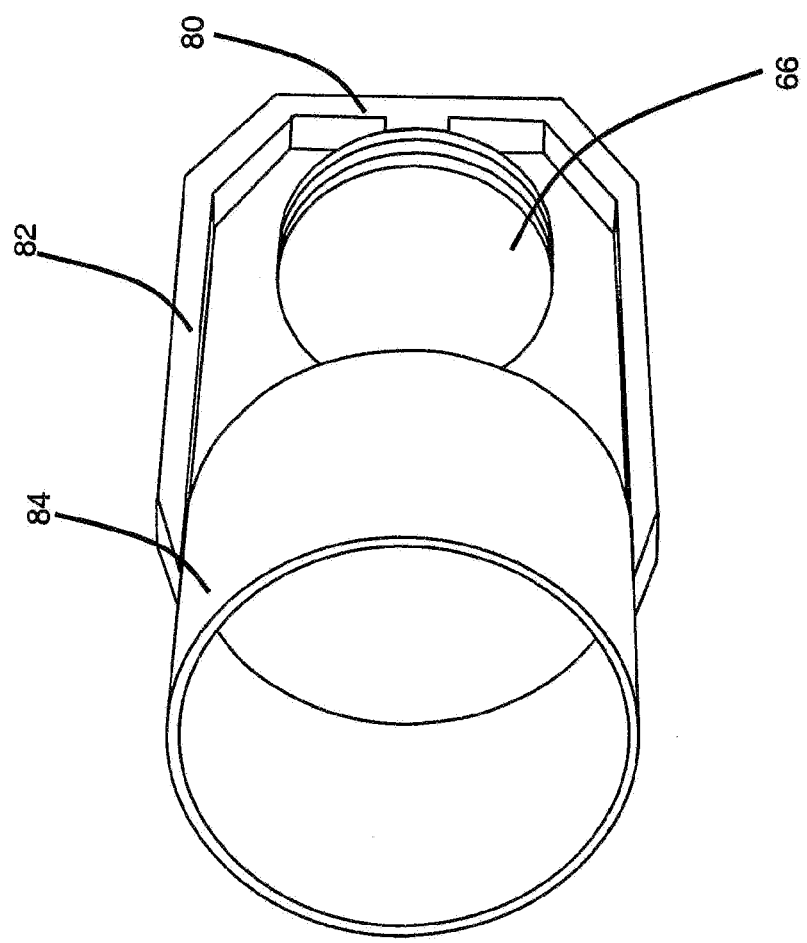
FIG. 11 is a perspective view of the outer regulator sleeve assembly of the embodiment of FIGS. 8 and 9.

The second valve piston 66 is housed within a second piston bore 76 in the valve body 70. The second piston 66 is connected by a piston rod 78 to a second cross member 80. The second cross member 80 has axially extending arms 82 at each end thereof attached to a second regulator sleeve 84. The second regulator sleeve 84 has a similar shape to the first regulator sleeve 74 and is arranged concentrically around the first regulator sleeve 74 adjacent the passage 60. The regulator valve member assemblies are also shown in FIGS. 10 and 11.

The pistons 64, 66 are spring biased towards the outlet end of the regulator by springs 88 and 90 arranged in the piston bores 68, 76. In use, when fluid pressure in the valve chambers 62, 63 exceeds a pre-determined maximum pressure, the two pistons 64, 66 are pushed in the axial direction towards the inlet end of the passage 60. Movement of the pistons towards the inlet causes the first and second regulator sleeves 74, 84 to extend across the passage 60 into contact with first and second seals 92, 93 in the outside wall 86 of the regulator. This seals the passage 60 from fuel being provided from the refuelling hose.

Referring in particular to FIG. 9, the fuel pressure sensing port 61 is one of a plurality of ports spaced around the circumference of the valve body 70, ensuring the pressure within the valve chamber 62 is substantially similar to that of the fuel passage 60. The pressure is regulated or measured with respect to atmospheric pressure, and this is provided on the air side of the pistons 64 and 66 by the vent ports 94 and 96 respectively. These each pass through a valve body support 98 which mounts the valve body 70 to the regulator outside wall 86. The vent ports and valve body support shown are one of a plurality, typically 4, equally spaced around the regulator.

Since the two regulator sleeves 74, 84 are effectively operated by upstream fluid pressure in the passage 30, and act together in adjacent positions, they do not interact negatively with each other. Again, since it is no longer necessary to provide a venturi in the fuel passage, the pressure drop from the inlet to the outlet end of the passage 60 may be significantly reduced.

Figure 12:
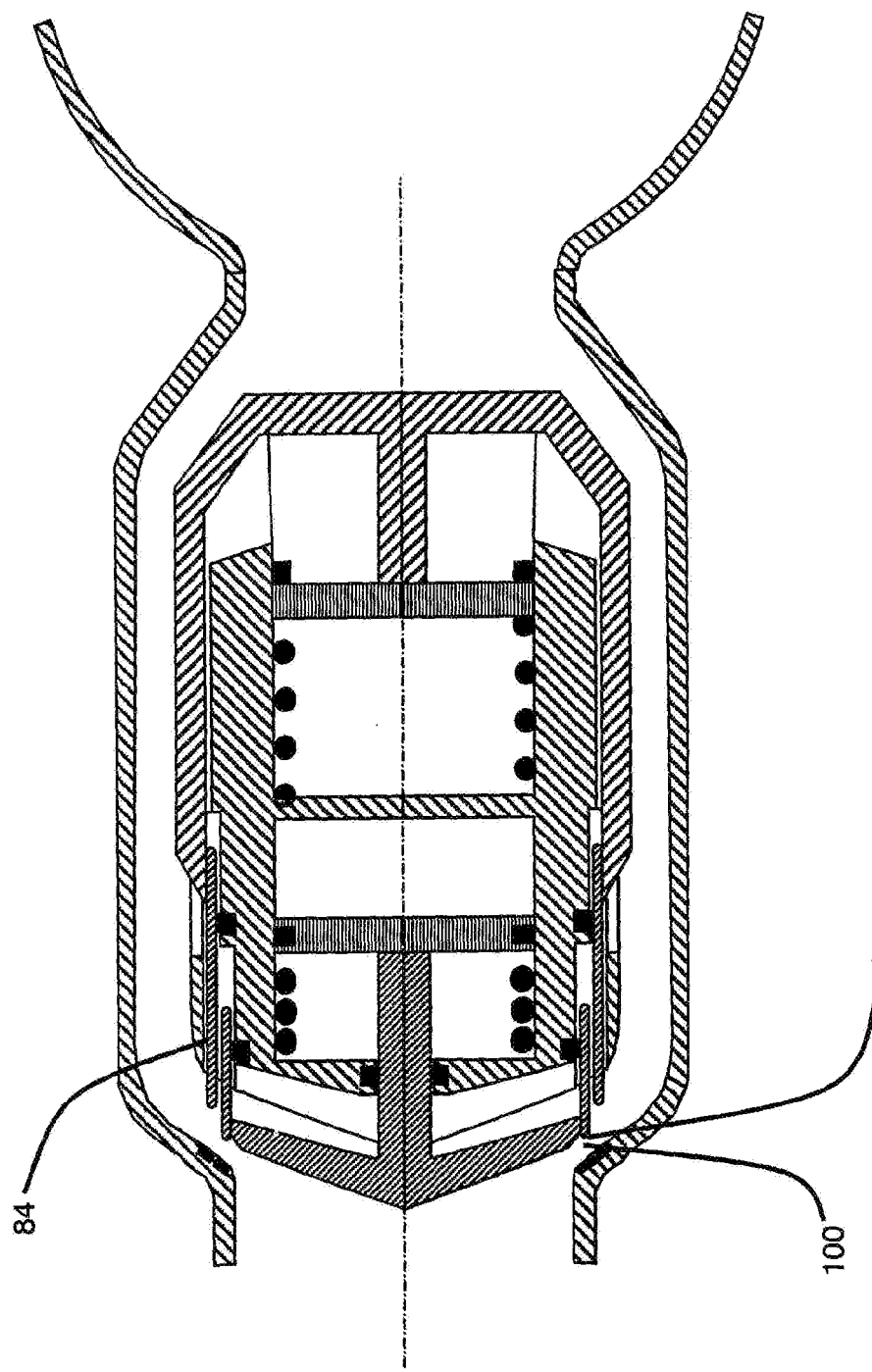
FIG. 12 is a view similar to FIG. 8 with the valve member closing.

Reference is now made to FIG. 12 to show the independence of the regulator valves further. This shows the arrangement of FIG. 8, with both regulator valves responding to high pressure in passage 60 by partially closing. For detailed design and manufacturing reasons, the regulators may not close by precisely the same amount, and in FIG. 12 the first or inner regulator sleeve 74 is shown slightly more closed than the second or outer regulator sleeve 84. The passage 60 is therefore constricted at 100, where the valve members cross the passage, reducing the pressure to the required regulated pressure downstream thereof, with a sensed higher pressure upstream thereof. In this situation, movement of the outer regulator sleeve 84 does not cause a change in pressures and will therefore not cause the inner regulator sleeve 74 to move.

Conversely, although movement in the inner sleeve will cause a change in pressures, and therefore the outer regulator sleeve 84 will move, its movement will not influence the pressure. The same rationale applies if the position is reversed, and the outer regulator sleeve 84 is more closed.

Therefore the second valve is acting as a 'safety' valve, with its operation not influencing the regulated pressure unless the first valve should fail.

The invention claimed is:

1. An air-to-air refuelling reception coupling comprising a main body arranged for connection to a refuelling hose, the main body of the reception coupling comprising
    an opening disposed towards an end of the main body, the opening being sized and arranged for receiving at least partially into the opening a refuelling probe of a receiver aircraft;
    a fuel passage for fuel having an inlet and an outlet, the outlet being provided adjacent the opening;
    a valve for opening the outlet to deliver the fuel, the valve comprising a concave probe-receiving portion for receiving a probe of a receiver aircraft, wherein the valve is sized and arranged to be opened by action on the valve probe-receiving portion of a refuelling probe of a receiver aircraft received at least partially into the opening;
    the main body of the air-to-air refuelling reception coupling including a pressure regulator valve arrangement, which comprises
        at least one pressure port in fluid communication with the fuel passage and
        a first pressure regulator valve and a second pressure regulator valve,
        the first pressure regulator valve comprising:
            a first actuator member, and
            a first valve member coupled to the first actuator member, wherein the first valve member is arranged to extend into the fuel passage in order to restrict the flow of the fuel in response to pressure at the at least one pressure port reaching a predetermined pressure, and
        the second pressure regulator valve comprising:
            a second actuator member, and
            a second valve member coupled to the second actuator member, wherein the second valve member is arranged to extend into the fuel passage in order to restrict the flow of fuel in response to pressure at the at least one pressure port reaching the predetermined pressure,
        wherein the at least one pressure port is arranged downstream of both of the first and second valve members;
        wherein the first and second pressure regulator valves are arranged for operation independently of each other and wherein each of the first and second pressure regulator valves is arranged to regulate to the same predetermined pressure;
        wherein the first and second actuator members are responsive to pressure at the at least one pressure port;
        wherein each of the first and second actuator members is configured to cause the respective one of the first and second valve members to move in a first direction to restrict the flow of fuel in the fuel passage, and each of the first and second actuator members is biased towards a second direction that is opposite to the first direction.

2. An air-to-air refuelling reception coupling as claimed in claim 1, in which the at least one pressure port is arranged for closing the fuel passage in response to pressure and is formed in a central body surrounded by the fuel passage.

3. An air-to-air refuelling reception coupling as claimed in claim 2, in which the at least one pressure port includes an open end of the central body.

4. An air-to-air refuelling reception coupling as claimed in claim 2, in which the at least one pressure port extends through a surface extending around a circumference of the central body.

5. An air-to-air refuelling reception coupling as claimed in claim 2, in which
    the central body includes a first valve chamber and a second valve chamber, the fuel passage being in fluid communication with at least one of the first and second valve chambers via the at least one pressure port; and
    the first and second actuator members of the first and second pressure regulator valves are disposed in the first and second valve chambers respectively.

6. An air-to-air refuelling reception coupling as claimed in claim 1, in which the first and second pressure regulator valves and the at least one pressure port are formed in a central body surrounded by the fuel passage.

7. An air-to-air refuelling reception coupling as claimed in claim 1, in which the first valve member is axially movable relative to the main body of the reception coupling for closing the fuel passage, and the second valve member is axially movable relative to the main body of the reception coupling for closing the fuel passage, wherein the first and second valve members are arranged for independent movement relative to the main body from one another.

8. An air-to-air refuelling reception coupling as claimed in claim 1, in which the fuel passage is annular, and the first and second valve members are sleeve shaped.

9. An air-to-air refuelling reception coupling as claimed in claim 8, in which the first and second valve members are concentrically arranged open-ended sleeves.

10. An air-to-air refuelling reception coupling as claimed in claim 9, in which one of the first and second valve members is at least partially disposed within the other of the first and second valve members.

11. An air-to-air refuelling reception coupling as claimed in claim 9, in which the first and second valve members are at least partially nested one within the other so that the overall axial extent of the first and second valve members when nested is less than the sum of the separate axial extents of each of the first and second valve members.

12. An air-to-air refuelling reception coupling as claimed in claim 1, in which the fuel passage is curved such that the first and second valve members are arranged to cross the fuel passage on axial movement of the first and second valve members relative to the main body.

13. An air-to-air refuelling reception coupling as claimed in claim 1, in which the first and second valve members are adjacent one another.

14. An air-to-air refuelling reception coupling as claimed in claim 8, in which the first and second valve members are adjacent one another and are concentrically arranged open-ended sleeves such that one of the first and second valve members is radially exterior to the other of the first and second valve members.

15. An air-to-air refuelling reception coupling as claimed in claim 1, in which the valve members are both adjacent the inlet of the fuel passage.

16. An air-to-air refuelling reception coupling as claimed in claim 1, in which the first and second actuator members are mounted in a central body surrounded by the fuel passage.

* * * * *

UNITED STATES PATENT AND TRADEMARK OFFICE
CERTIFICATE OF CORRECTION

PATENT NO. : 9,352,847 B2  
APPLICATION NO. : 13/939741  
DATED : May 31, 2016  
INVENTOR(S) : Christopher Mouskis Page 1 of 1

It is certified that error appears in the above-identified patent and that said Letters Patent is hereby corrected as shown below:

Title Page, item (62), in the Related U.S. Application Data, "May 22, 2009" should read --May 22, 2008--.

Signed and Sealed this  
Second Day of August, 2016

Michelle K. Lee  
*Director of the United States Patent and Trademark Office*